United States Patent [19]
Spies

[11] 3,865,272
[45] Feb. 11, 1975

[54] APPARATUS FOR TRANSFERRING CYLINDRICAL ARTICLES AND THE LIKE FROM A SUPPLY STATION TO A WORK STATION

[75] Inventor: Harvey A. Spies, Baltimore, Md.
[73] Assignee: Maryland Cup Corporation, Owings Mills, Md.
[22] Filed: Nov. 16, 1971
[21] Appl. No.: 199,270

[52] U.S. Cl.................. 221/236, 221/260, 221/296
[51] Int. Cl.............................................. B65h 5/00
[58] Field of Search .......... 221/236, 237, 277, 268, 221/251, 269, 232, 272, 289, 296, 260; 198/62

[56] References Cited
UNITED STATES PATENTS

| | | | |
|---|---|---|---|
| 1,341,821 | 6/1920 | Perri | 221/251 |
| 1,393,947 | 10/1921 | Colbert | 221/236 |
| 2,543,834 | 3/1951 | Davis | 221/226 |
| 2,550,616 | 4/1951 | Stephano | 221/236 |
| 2,611,470 | 9/1952 | Rudolph | 221/236 |
| 2,674,755 | 4/1954 | Schlicksupp | 221/237 |
| 2,723,049 | 11/1955 | Ward | 221/237 |
| 2,944,260 | 7/1960 | Effgen | 221/272 |
| 3,545,589 | 12/1970 | Keller | 221/236 |

FOREIGN PATENTS OR APPLICATIONS

| | | | |
|---|---|---|---|
| 1,051,195 | 2/1959 | Germany | 221/236 |
| 829,949 | 3/1960 | Great Britain | 221/237 |

Primary Examiner—Robert B. Reeves
Assistant Examiner—H. Grant Skaggs, Jr.
Attorney, Agent, or Firm—Terrell C. Birch Anthony L. Birch

[57] ABSTRACT

An apparatus is provided for transferring elongated cylindrical articles from a supply station to a work station. First and second supply hoppers are provided whereby said articles may be temporarily stored in said second supply hopper in the event that said work station is temporarily shut down. A guide defined by spaced parallel sets of rails having a right-angular bend is provided to receive said articles which exit from said second supply hopper and deliver said articles to said work station at a position below and outboard of said second supply hopper. A gating member is provided for selectively gating said articles from said guide to said work station.

4 Claims, 3 Drawing Figures

INVENTORS

BY HARVEY A. SPIES

3,865,272

APPARATUS FOR TRANSFERRING CYLINDRICAL ARTICLES AND THE LIKE FROM A SUPPLY STATION TO A WORK STATION

This invention relates to packaging equipment for uniform elongated articles such as cylindrical objects and the like and more particularly, to a means for transferring such objects from a reservoir or hopper to a work station, such as a packaging or wrapping station, in a positive indexed manner.

It is therefore, an object of the present invention to provide new and novel apparatus for handling and transferring substantially uniform elongated objects from a reservoir or supply station to a packaging or wrapping station.

It is therefore, an object of the present invention to provide new and novel apparatus for handling and transferring substantially uniform elongated objects from a reservoir or supply station to a packaging or wrapping station and wherein the mechanism provided is of optimum simplicity, operates at optimum speeds and is more efficient and reliable than handling devices previously known in the art.

These and other objects of the invention will become more fully apparent with reference to the following specification and drawings which relate to a preferred embodiment of the present invention.

IN THE DRAWINGS

Figure 1:
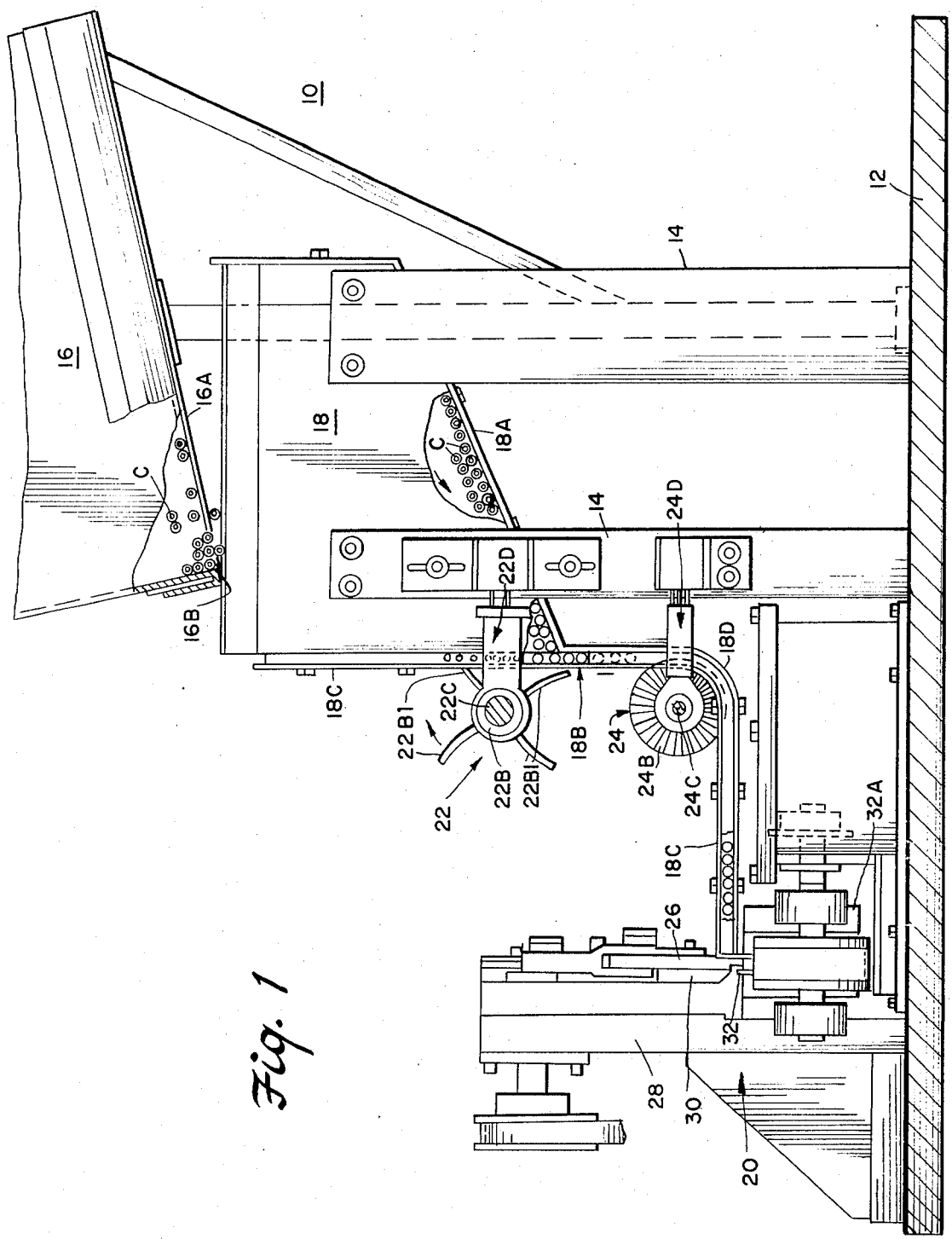
FIG. 1 is a side sectional view of the machine according to the invention.

The devices being handled by the equipment of the present invention for purpose of illustration are shown as being hollow cylindrical articles. Accordingly, the present invention will be described in connection with this type of article, but is not limited thereto. The equipment of the present invention is adapted for use with any type of substantially uniform elongated articles which are to be fed one at a time in an indexed coordinated manner from a reservoir supply hopper to a work station, such as a wrapping or packaging station for packaging individually or in a predetermined group.

Referring in detail to the drawing, the present invention is shown as comprising a machine complex 10 having a bed or base plate 12 on which are mounted the several elements of the machine complex 10.

Extending vertically upward from the bed 12 are a pair of stanchions 14, at the top of which are mounted superimposed supply hoppers 16 and 18, hereinafter referred to as the upper supply hopper 16 and lower supply hopper 18, respectively. The upper supply hopper 16 has a sloping lower floor 16A therein on which are illustrated a plurality of cylindrical articles C which are adapted to be fed by gravity downward along the tilted bed 16A of the upper hopper 16 and then through a discharge slot 16B at the lower end thereof into the upper end of the lower supply hopper 18.

The lower supply hopper 18 includes a sloping lower floor 18A which causes the cylindrical article C therein to trend by gravity down towards an outlet slot 18B at the lower most end of the floor 18A in the said lower supply hopper 18.

The supply hoppers 16 and 18 are of a size comparable with the length of each of the cylindrical articles C such that the articles will properly orient themselves substantially parallel and coextensive with one another across the inclined floors 16A and 18A of the upper and lower supply hoppers.

The discharge slot 18B of the lower supply hopper 18 is formed by having the adjacent end wall of the lower hopper 18 partially open as defined by first and second parallel vertical guide rails or members 18C spaced from and affixed to the hopper 18, and extending down below the hopper through a gradual right angle bend to a position outboard and below the lower hopper 18, said position being immediately adjacent a packaging or wrapping station 20 or the like. A pair of like parallel guide rails 18D extend coterminately of the guide members 18C from the floor 18A of the hopper 18 to the packing or wrapping station 20. The spacing between the guide rails 18C and the cooperating guide rails 18D is slightly greater than the diameter of the cylindrical articles C which are to be selectively dispensed from the lower hopper 18 and thereby, the guide rails 18C and 18B cooperate to form a split guide track for conveying the cylindrical articles C out of the hopper 18 through the discharge slot 18B and thence from the discharge slot 18B through the said guide rails 18C–D to the packaging station 20 in single file.

Basically, the cylindrical articles C are intended to fall by gravity through the discharge slot 18B and down between the guide rails 18C–D in travelling towards the packaging station 20 from the lower supply hopper 18. In order to prevent jamming of the cylindrical articles C in the hopper 18, and also in the horizontal reach of the track of the guide rails 18C–D outboard of the hopper 18, there are provided first and second article impelling means 22 and 24 for frictionally engaging the articles C and causing their side by side traverse movement in contiguous relation along the guide rails 18C–D towards the packaging station 20. The first impelling means 22 comprises a pair of rotating hubs 22A and 22B, said rotating hubs 22A and 22B each having a plurality of radially extending flexible flails 22A1 and 22B1, respectively, mounted on the said hubs. The second impelling means 24 comprises a pair of rotating cylindrical brushes 24A and 24B mounted on a common shaft 24C which is journalled in journal means 24D on one of the vertical stanchions 14. The rotary brushes 24A and 24B are located directly below the rotary flail hubs 22A and 22B immediately adjacent the right angle bend in the guide rails 18C and 18D, such that the action of the rotary brushes 24B is substantially in conformity with the right angle bend. In other words, the rotary brushes 24A and 24B engage the cylindrical articles C between the guide rails 18C and 18D and impell them through the gradual right angle bend in the said guide rails, causing them to traverse the outboard reach of the guide rails 18C–D towards the packaging or wrapping stations 20.

The rotary flails 22A1 and 22B1 extend between the vertical guide rails 18C on the face of the lower hopper 18 into resilient frictional engagement with the stacked cylindrical articles C within the hopper 18 and cause rotation and agitation of these articles to cause them to enter the discharge slot 18B in the lower hopper 18 without binding or jamming. The rotating flail hubs 22A and 22B are mounted on a common rotary shaft 22C which is journalled above the rotary shaft 24C on the same vertical stanchion 14 by sealable journalled means 22D.

Each of the rotary shafts 22C and 24C are adopted to be rotated in the same direction by means of conventional integrated belt and pulley drive means (not shown) synchronized with the speed of th machine.

In order to insure individual dispensing of the cylindrical articles C from the outboard end of the coterminate guide rails 18C, 18D at the packing or wrapping station 20, there is provided a reciprocating vertical gate 26 mounted on a vertical stanchion at the wrapping station 20. The vertical gate 26 reciprocates immediately adjacent a vertical backing plate 30 which extends down into an article receiving depression 32 in a supporting block 32A mounted on the stanchion 28, the depression 32 extending parallel to the latitude of the cylindrical articles C as they leave the outboard end of the coterminate guide rails 18C–18D such cylindrical article C will fall into the depression 32 as it leaves the guide rails 18C–18D.

Figure 2:
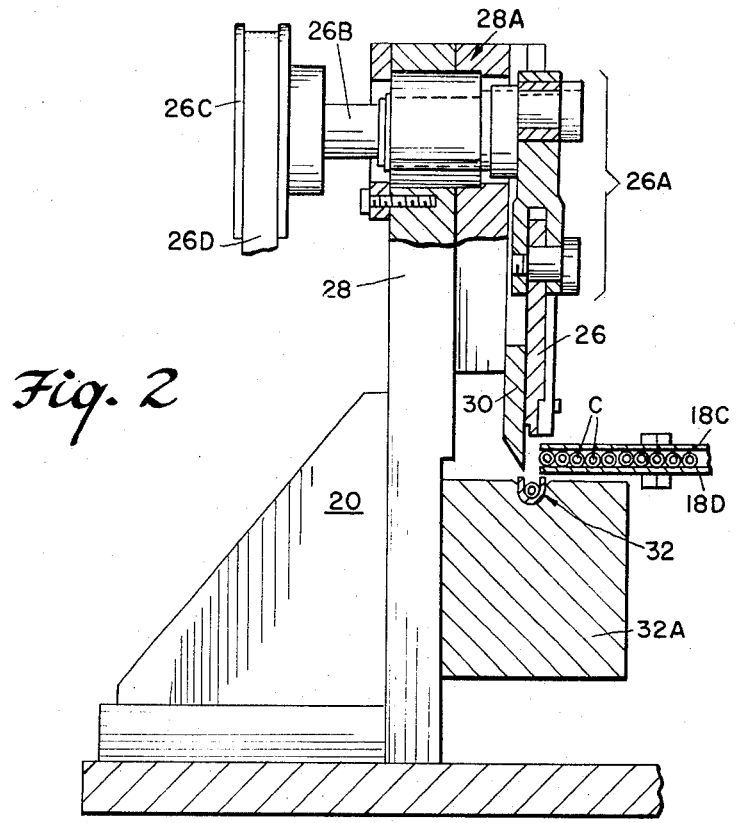
FIG. 2 is a partial view in section of the wrapping station of FIG. 1.
Figure 3:
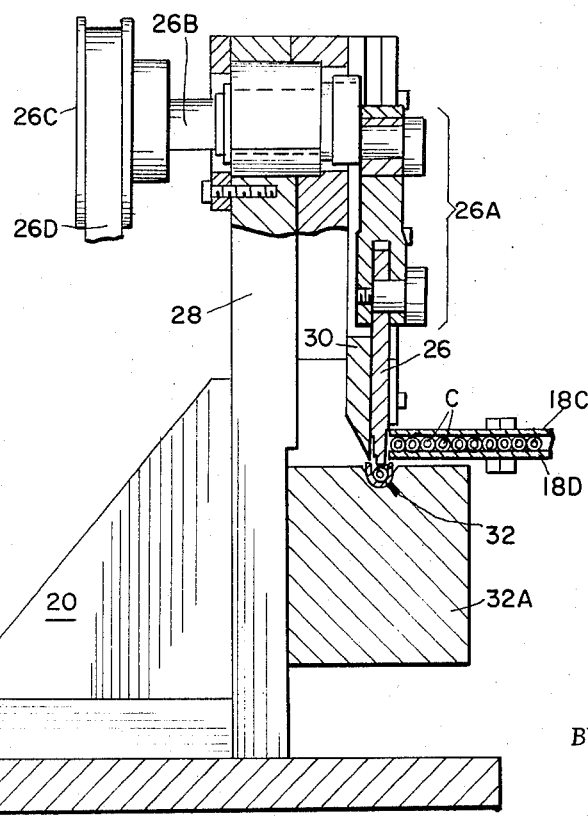
FIG. 3 is a similar view to FIG. 2 with the channel feeding means in a different position than that shown in FIG. 2.
Figure 4:
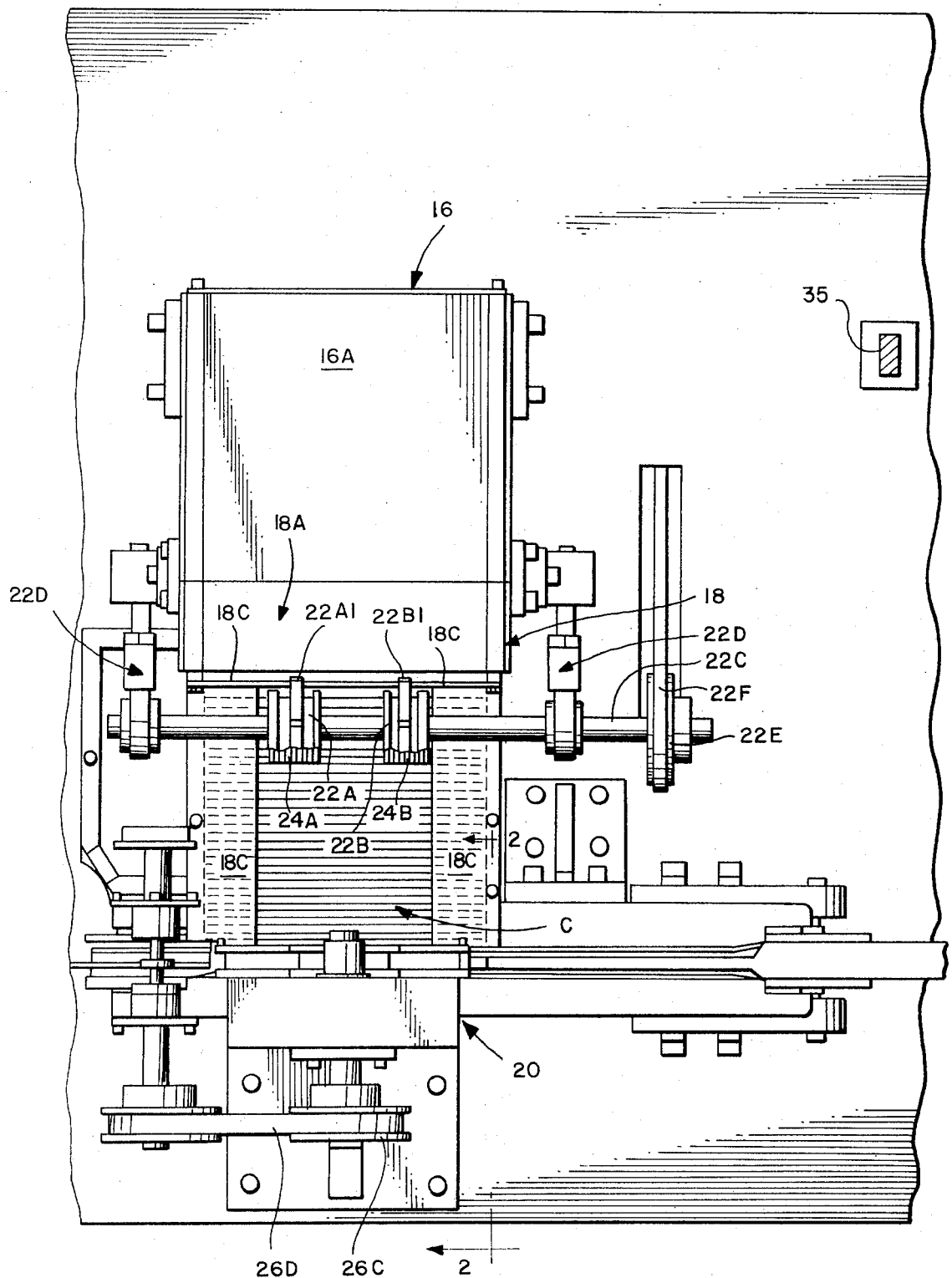

As best shown in FIGS. 2 and 3 the lower end of the vertical backing plate 30 extends downward into immediate proximity with that edge of the depression 32 which is most removed from the outboard end of the coterminate guide rails 18C–18D and remains in this position to act as a boss to direct the cylindrical articles C, dispensed from the outboard end of the guide rails 18C–18D, down into the article receiving depression 32 in the stationery block 32A.

The reciprocating vertical gate 26 is driven through a conventional eccentric drive linkage 26A which is journalled in a journal means 28A on the stanchion 28 and which further includes a drive shaft 26B to which is affixed a drive pulley 26C drive from a drive belt 26D from a suitable power source, not shown, which is synchronized with the speed of the machine. The vertically reciprocating gate 26 is positioned sufficiently close to the outboard end of the coterminate guide rails 18C–18D as to preclude discharge of cylindrical articles C from the outboard end thereof when the reciprocating gate 26 is in its lowermost position as shown in FIG. 3. When the gate 26 is in its uppermost position as shown in FIG. 2 then one of the cylindrical articles C, due to the rate of reciprocating imparted to the gate 26 via the drive belt 26B, drive pulley 26C and drive shaft 26B through the eccentric linkage 26A is such as to permit one of the cylindrical articles C to discharge from the outboard end of the coterminate guide rails 18C–18D. By selective variation of the rate of reciprocation of the vertically reciprocating gate 26, any given number of cylindrical articles C may be selectively discharged through one stroke of the gate 26.

The operation of the machine according to the present invention will now be briefly described.

The elongated cylindrical articles C in first supply hopper 16 are caused by gravity to move down sloping floor 16A and to exit through slot 16B. Said articles fall into the open top portion of the second supply hopper 18. In a similar manner articles C are caused by gravity to move down sloping floor 18A of supply hopper 18 to exit slot 18B. At this point, if the articles already present between rails 22C, 22B are moving at a rate comparable to the rate of supply to hopper 18, the articles reaching slot 18B will pass one at a time directly into the space between guide rails 22C, 22B. However, if the articles between said guide rails are not moving or are moving at a slower rate than the rate of articles entering hopper 18, due to a temporary shut down of the work station, the articles C will temporarily accumulate in storage hopper 18 until the work station resumes normal operation.

The articles will then pass between guide rails 22B, 22C wherein said articles are engaged by impeller means 22, 24 and pushed through the space between said rails toward said work station. Reciprocating gating member 26 will them pass said articles to said work station at a selected rate.

Although the foregoing description sets forth the principles of the invention in connection with specific elements, it is to be clearly understood that this description is made only by way of example and not as a limitation of the scope of the invention as set forth in the objects thereof and in the accompanying claims.

I claim:

1. An apparatus for transferring elongated articles from a supply station to work station comprising:
   a. guide means having an outlet end adjacent said work station and holding a plurality of said objects in tandem with the long dimension of the latter disposed transversely of the said guide means;
   b. a reciprocating gate means mounted across said outlet end of said guide rails, adjacent said work station, for passing said articles to said work station in a first open position and for blocking the passage thereto in a second closed position;
   c. flexible rotary brush means continuously energized and engaging one or more of said elongated articles in said guide means for continuously impelling said articles in side-by-side contiguous relationship toward said gate means with a substantially constant biasing force; and
   d. means for selectively varying the rate of reciprocation of said gate means between said first and second positions to selectively control the number of said articles passed through said gate means from said guide means while said gate means is in said first position in each reciprocation of said gate means.

2. An apparatus for transferring elongated articles or the like from a supply station through a gate means to a work station comprising:
   a. a hopper means located at said supply station for receiving said elongated articles therefrom, said hopper means, having a downwardly sloping floor providing gravity feed of said articles and an adjacent vertically disposed end wall terminating in and defining an exit slot, said end wall being relieved to define an access opening therein adjacent said exit slot;
   b. a first set of respectively parallel guide rails spaced from each other and affixed to said hopper means and having a vertical portion extending down below said hopper from a position adjacent one side of said exit slot, said guide rails extending continuously from said vertical portion through a substantially right-angular bend into a bend into a substantially horizontal portion to said work station at a position outboard and below said hopper;
   c. a second set of parallel guide rails extending coterminately and parallel to said first set to guide rails from the floor of said hopper at a position adjacent the other side of said exit slot to said work station; said first and second set of rails forming a guide means for said articles between said exit slot and said work station; and d. means for gating said elongated articles from the terminal end of said guide means through said gate means to said work station, comprising impeller means for medially engaging said elongated articles between said first and second spaced sets of guide rails and pushing said articles along said guide means through said gate means to said work station, said impeller means including first impeller members located adjacent to and spaced transverse said exit slot, engaging said articles through said access opening, and transversely spaced second impeller members located adjacent to and between said right-angular bend of said spaced sets of guide rails, said spaced second impeller members providing a constant bearing force on the said articles to the said gate at the terminal ends of said spaced sets of guide rails to said work station;

e. said gate means being a reciprocating gate mounted and positioned sufficiently close to the respective coterminate ends of the guide rails to preclude discharge of said elongated articles from the respective outboard ends of said guide rails when said gate means is in its lowermost position and to permit one or more of said articles to pass through said gate means in its uppermost position.

3. An apparatus according to claim 2, said first impeller member comprising a pair of rotating hubs; said rotating hubs each having a plurality of radially extending flexible flails, respectively, mounted on said hubs; and said second impeller member comprises a pair of rotating cylindrical brushes mounted on a common shaft; whereby said flails and said brushes engage said articles between said rails and push said articles to said work station.

4. An apparatus according to claim 2, said hopper means comprising a storage space, wherein said articles may be temporarily stored, if the rate of ingress to said hopper means exceeds the rate of egress.

* * * * *